July 6, 1948.  H. C. WILSON  2,444,621
TOOL HOLDER
Filed Jan. 29, 1945  2 Sheets-Sheet 1
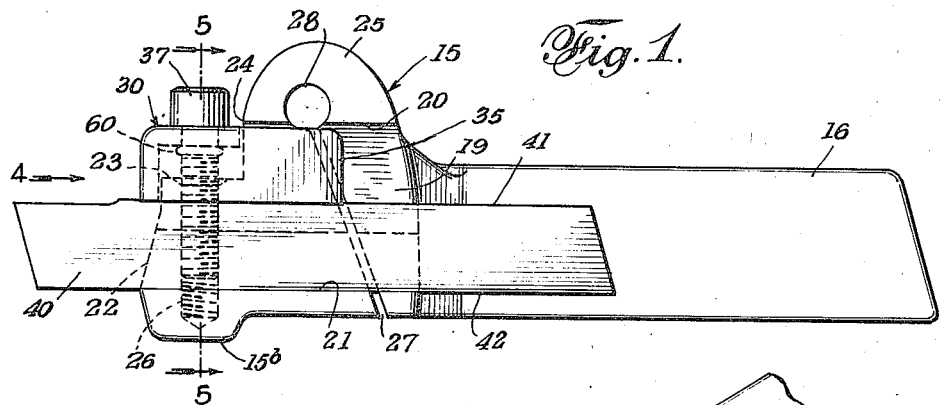
INVENTOR.
HARRY C. WILSON
BY
ATTORNEY July 6, 1948. H. C. WILSON 2,444,621
TOOL HOLDER
Filed Jan. 29, 1945 2 Sheets-Sheet 2
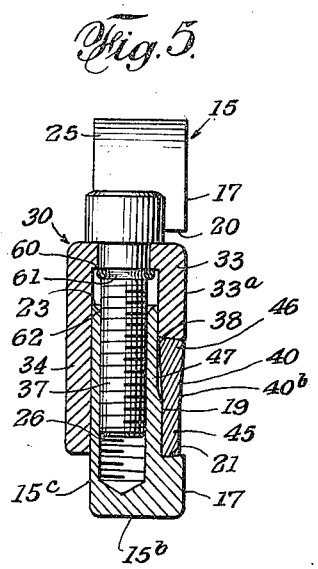
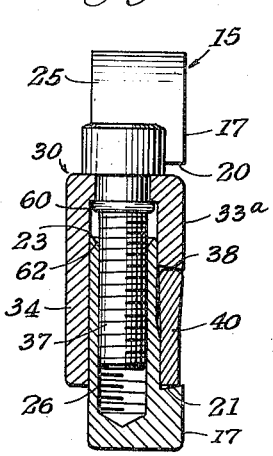
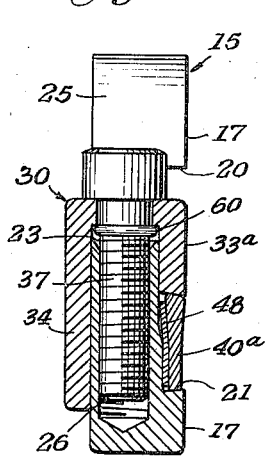
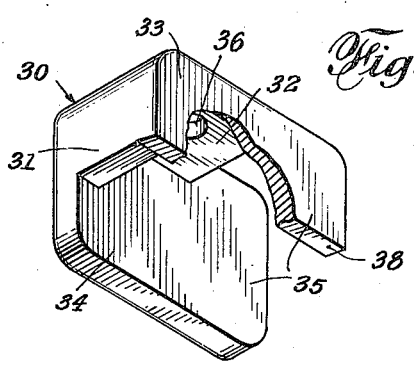
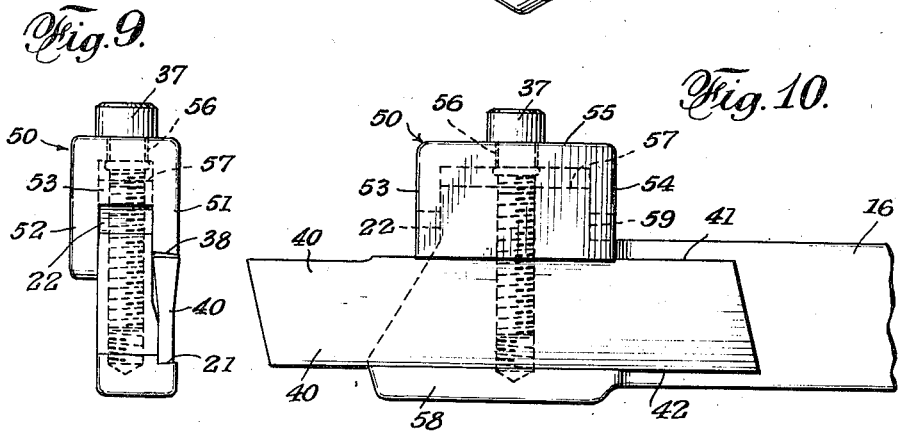
INVENTOR.
HARRY C. WILSON
BY
ATTORNEY Patented July 6, 1948

2,444,621

UNITED STATES PATENT OFFICE 2,444,621

TOOLHOLDER

Harry C. Wilson, Sherman Oaks, Calif., assignor to Robert H. Clark, Los Angeles, Calif.

Application January 29, 1945, Serial No. 575,005

3 Claims. (Cl. 29—97.5)

This invention relates to tool holders and deals more particularly with holders for tools used in parting or cutting off operations.

In machine tools of the work rotating type, and in which the work is held in a chuck or collet, the greatest accuracy is obtained when the work has an essential minimum projection from the face of the chuck or collet. In this manner springing of the work due to tool pressures are minimized. With a minimum projection, cut-off of the finished work is necessary at a point as close to the face of the chuck or collet as is feasible. Frequently, also, it is necessary to perform the cut-off operation immediately adjacent a large shoulder or wall.

Heretofore, off-set cutting tools were commonly used to accomplish such cut-off operations. It is evident, however, that such tools were unnecessarily expensive and were also faulty in that the overhang of the tool with respect to its support was frequently greater than was practicable. Such tools had, of necessity, to be more sturdily made because of the off-set, entailing a considerable waste of expensive steel alloys. Keeping such off-set tools in efficient working condition required greater skill and more time than would be required for a straight tool.

The primary object of this invention, therefore, is to provide a tool holder for straight parting or cut-off tools which will enable the cut-off to be performed at a point close to the chuck or collet holding the work, or to a large shoulder adjacent to the point of cut-off.

Another object is to provide a tool holder of simple, inexpensive design in which a straight cut-off tool may be held and applied close to a work holding chuck or collet, or the like.

Another object is to provide a tool holder for effectively holding various widths and thicknesses of straight cut-off tools, rendering said tool holder suitable for a variety of uses.

The various objects and features of my invention will be fully understood from the following detailed description of typical preferred forms and applications of the invention, throughout which description reference is made to the accompanying drawings, in which:

Fig. 1 is a side view of a tool holder according to the present invention, said holder being fitted with a cut-off tool approaching maximum width. Fig. 2 is a plan view thereof, a portion of the shank being broken away. Fig. 3 is a broken side view of said tool holder fitted with a cut-off tool approaching minimum width. Fig. 4 is an end view as seen in the direction of the arrow 4 of Fig. 1. Fig. 5 is a cross sectional view as taken on the line 5—5 of Fig. 1. Fig. 6 is a similar view showing a slightly modified form of the invention. Fig. 7 is a sectional view similar to Fig. 6 showing the holder fitted with a relatively thin and narrow cut-off tool and indicating a manner of shimming said tool in desired position. Fig. 8 is a partly broken underside perspective view of a clamp cap employed in the invention. Fig. 9 is an end view of an alternate form of tool holder, and Fig. 10 is a side view thereof, the shank being broken away.

Referring now to the drawings in greater detail and with more particular reference to Figs. 1 to 8, inclusive, the tool holder comprises a head 15 and a shank 16. As best seen in Fig. 2, the head and shank are preferably arranged at an angle to each other, the degree of said angle being such as to permit clamping of the shank in a tool post so that the latter resides within a projected plane of the outer face 17 of the head 15.

The head 15, on its outer face, is preferably provided with a channel forming a seat 18, said seat being defined by a face 19 substantially parallel with the face 17 and by respective upper and lower walls 20 and 21. As can be seen from Fig. 5, for instance, the seat 18 may be relatively shallower adjacent the lower wall 21 than it is adjacent the upper wall 20, for reasons later apparent. However, for ease of manufacture, the seat 18 preferably extends entirely across the head 15 from the front edge 22 of the head to the bend formed between the head and shank.

The head 15 also is preferably provided with a top face or ledge 23 extending from the front edge 22 rearwardly to a wall 24 defining the front edge of an upwardly projecting neck or connecting portion 25 of said head. The head 15 also may be provided with a screw seat 26 opening extending downwardly into it from the ledge 23. The head also may be provided with a slot 27 extending from a transverse opening 28 in the upwardly projecting portion to the bottom edge of the head, whereby the head is provided with backing off properties to obviate seizing and chatter of the tool. The slot 27 and opening 28 divide the head into an inner portion that is rigidly joined to the forward end of the shank and an outer portion where the ledge 23 is located, the inner and outer portions being joined by the upwardly projecting part 29 which allows for a desired amount of yield or resilience between the inner and outer portions.

From the above, and especially from Fig. 5, it may be seen that the head is formed as an L-shaped section, said section being defined by the ledge 23, the face 19, tool supporting wall 21, front face 17, bottom edge 15$^b$ and rear face 15$^c$.

Associated with the tool holder, there may be provided a clamp cap 30, best seen in Fig. 8. Said clamp cap may be formed with a forward end wall 31, a top wall 32, and respective front and rear side walls 33 and 34. The side walls are preferably spaced and arranged to extend inwardly or rearwardly as wings 35 beyond the free edge of the top wall 32. The length of these wings may vary, it being preferred to make the wings extend inward beyond the slot 27 to engage the front and rear faces of the inner portion of the head beyond said slot. In this manner, undue weave of the head is obviated.

The top wall 32 of the cap is preferably provided with an opening 36 which aligns with the screw seat 26 when the clamp cap is placed on the head, as shown. Whereas the clamp cap has a definite position lengthwise of the head when the clamp screw 37 is in place, and has definite position sidewise because of the confinement of the head between the cap walls 33 and 34, it may have variable up and down position with respect to the wall 21 of the head. Such adjustability or vertical movement of the cap permits the clamping of cut-off tools of varying width between the wall shoulder or ledge 21 and the bottom edge 38 of the front side wall 33 of the cap. As may be seen from Figs. 1, 4 and 5, a relatively wide tool 40 may be accommodated, and from Fig. 3, that a relatively narrow cut-off tool 40$^a$ may be held with equal efficacy.

While the respective top and bottom edges 41 and 42 of the tool 40 or 40$^a$ may be parallel and square with the side faces of said tool, as shown in Fig. 6, these edges 41 and 42 are preferably angled toward each other in the direction of the outer face of the tool, as best seen in Fig. 5. Accordingly, the wall 21 on the head and the wall 38 on the cap, which cooperate to clamp the tool, are also preferably angled toward each other in the direction of the outer face 17 of the head. In this manner a dove-tail groove defined by the faces or walls 19, 21 and 38 is formed to receive the tool 40. It is evident that upon tightening the screw 37 the walls 21 and 38 will cooperate to urge the tool 40 tightly against the face 19, to firmly seat the same in the head. As seen from Fig. 6, either of the shapes of tools above mentioned may be clamped with equal assurance against displacement. In this connection it will also be observed that the tool 40 or 40$^a$ is provided with relief on both side faces thereof, resulting in a relatively thinner section 45 at the lower edge and a relatively thicker tapered section 46 at the upper edge. It is for this reason that the wall 19 is relieved as at 47 to provide a shallower seat for the thinner section 45 than is provided for the thicker section 46, as previously indicated herein.

It will be noted how efficiently and simply the objects of the invention are realized by the above described structure, by obtaining substantial coplanar disposition of the outer face 17 of the head, the outer face 33$^a$ of the clamp cap, and the outer face 40$^b$ of the tool 40 or 40$^a$. It will be noted also that the tool is firmly held against inadvertant displacement and that there are no overhanging portions to interfere with close application of the tool to the face of a chuck, collet, or the like.

Of course, a tool thicker than the depth of the seat 18 may be used, as can be well understood. However, should the tool be substantially thinner than the depth of said grooves, means such as a shim 48 (shown in Fig. 7) may be employed to bring the outer face of the tool substantially coplanar with the outer faces 17 and 33$^a$ of the head and cap, respectively.

The invention is subject to a side latitude of variations. For example, Figs. 9 and 10 show an alternate form of tool holder wherein the clamp cap 50 is substantially symmetrically formed, including opposed front and rear side walls 51 and 52, respectively, similar side walls 53 and 54, and a top wall 55 having an opening 56 for a screw 37. In this form of the invention the top face or ledge 57 may extend between the front edge 22 and the rear edge 59 of the head 58. In other respects, the structure may follow the forms of the invention above described except that the head is solid or rigid since it has no neck portion dividing it into inner and outer portions as first described.

Either of the forms of the invention above described may be provided with means whereby the screw 37 is both made captive to the cap 30 and may serve to lift and free the latter against any freezing of said cap to the head 15. To this end means such as a snap ring 60 may be mounted in a groove 61 formed in the shank of the screw 37 and so positioned as to substantially confine the wall 32 between said snap ring and the head of the screw. In order to permit full adjustability of the cap 30, the ledge 23 may be countersunk or otherwise relieved as at 62, to accommodate said snap ring in its lowermost position.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In a tool holder of the character described, a shank for mounting said holder, a head carried by the shank comprising an inner portion rigidly connected with said shank and an outer portion yieldingly connected with the inner portion, and a member for clamping a tool to the outer portion and having opposed walls engaging opposite faces of both the inner and outer portions of the head whereby twist of one with respect to the other is obviated.

2. A tool holder of the character described including a shank, a head at the forward end of the shank and having an upwardly facing tool seat at one side, a clamp to clamp a tool to the seat including spaced depending sides extending down over the upper portion of the head to be stabilized by the sides of the head, one of the sides of the clamp having a lower edge opposing the tool seat, and a screw carried by the head and engaging the clamp to operate it, the clamp having an end extending between the sides and engaging an end of the head.

3. A tool holder of the character described including a shank, a head at the forward end of the shank and having an upwardly facing tool seat at one side, a clamp to clamp a tool to the seat including spaced depending sides extending down over the upper portion of the head to be stabilized by the sides of the head, one of the sides of the clamp having a lower edge opposing the tool seat, and a screw carried by the head and engaging the clamp to operate it, the head having an inner portion rigid with the shank, an outer portion having the seat and a resilient neck connecting said portions, and the sides of the clamp being in engagement with the sides of the outer portion of the head and having inwardly extending wings engaging the sides of the inner portion.

HARRY C. WILSON.

REFERENCES CITED

The following references are of record in the file of this patent:

UNITED STATES PATENTS

| Number | Name | Date |
|---|---|---|
| 622,625 | Hill | Apr. 4, 1899 |
| 1,058,360 | Gheen | Apr. 8, 1913 |
| 1,097,818 | Packewitz et al. | May 26, 1914 |
| 1,120,782 | Amborn | Dec. 15, 1914 |
| 1,647,989 | Gibbs | Nov. 8, 1927 |
| 2,225,327 | Walker | Dec. 17, 1940 |
| 2,243,239 | Zasada | May 27, 1941 |
| 2,254,056 | Anthony | Aug. 19, 1941 |

FOREIGN PATENTS

| Number | Country | Date |
|---|---|---|
| 17,416 | Great Britain | July 27, 1909 |